US005791215A

United States Patent [19]

Morrison et al.

[11] Patent Number: 5,791,215

[45] Date of Patent: Aug. 11, 1998

[54] METHOD OF CUTTING PATTERNS OUT OF PATTERNED FABRICS WITH A CUTTING APPARATUS WHICH INCLUDES A SCANNING DEVICE

[75] Inventors: Kenneth Morrison; Alexander Mitchell, both of Glasgow, United Kingdom

[73] Assignee: Morrison Technology Limited, Glasgow, Scotland

[21] Appl. No.: 211,523

[22] PCT Filed: Oct. 2, 1992

[86] PCT No.: PCT/GB92/01813

§ 371 Date: Mar. 31, 1994

§ 102(e) Date: Mar. 31, 1994

[87] PCT Pub. No.: WO93/07327

PCT Pub. Date: Apr. 15, 1993

[30] Foreign Application Priority Data

Oct. 2, 1991 [GB] United Kingdom .................. 9120900
Jul. 17, 1992 [GB] United Kingdom .................. 9215310

[51] Int. Cl.[6] .......................... D06H 7/16; B23Q 35/128; B26D 5/00

[52] U.S. Cl. .................................... 83/13; 83/56; 83/368; 83/910; 83/940; 364/474.09

[58] Field of Search .................................... 83/76.6, 76.7, 83/76.8, 76.9, 368, 565, 938, 939, 940, 941, 72, 910, 13, 56; 364/474.09, 474.37; 382/151

[56] References Cited

U.S. PATENT DOCUMENTS

| | | | |
|---|---|---|---|
| 3,486,957 | 12/1969 | Fish et al. | 83/171 X |
| 3,587,378 | 6/1971 | Oppenheim et al. | 83/201.7 |
| 3,609,237 | 9/1971 | Gerber | 178/18 |
| 3,761,675 | 9/1973 | Mason et al. | 364/474.09 X |
| 3,769,488 | 10/1973 | Hasslinger | 364/474.09 |
| 3,803,960 | 4/1974 | Pearl et al. | 83/76.8 X |
| 3,855,887 | 12/1974 | Pearl et al. | 83/940 X |
| 3,864,997 | 2/1975 | Pearl et al. | 83/940 X |
| 4,178,820 | 12/1979 | Gerber | 364/474.09 X |
| 4,233,625 | 11/1980 | Altman | 382/151 X |
| 4,327,615 | 5/1982 | Gerber et al. | 83/76.8 X |
| 4,739,487 | 4/1988 | Bonnet et al. | 364/474.09 X |
| 4,833,957 | 5/1989 | Lundgren | 83/368 X |
| 4,907,169 | 3/1990 | Lovoi | 364/513 |
| 4,961,149 | 10/1990 | Schneider et al. | 83/76.4 X |
| 5,042,339 | 8/1991 | Gerber | 83/76.6 X |
| 5,333,111 | 7/1994 | Chaiken et al. | 83/76.8 X |

FOREIGN PATENT DOCUMENTS

| | | | |
|---|---|---|---|
| 1000976 | 5/1989 | Belgium . | |
| 1203319 | 1/1960 | France . | |
| 2461055 | 3/1981 | France | 83/368 |
| 2329238 | 1/1975 | Germany . | |
| 3837493 | 3/1989 | Germany . | |
| 8907823 | 11/1989 | Germany . | |
| 4026250 | 3/1992 | Germany . | |
| 9113625 | 3/1992 | Germany . | |
| 993705 | 6/1965 | United Kingdom . | |
| 1059423 | 2/1967 | United Kingdom . | |

*Primary Examiner*—Clark F. Dexter
*Attorney, Agent, or Firm*—Ratner & Prestia

[57] ABSTRACT

Precise cutting of pattern strips and pattern pieces from lace and similar patterned fabrics requires correct mutual positioning of the fabric and fabric cutter for precise alignment with the boundary of the pattern pre-existing on the fabric. Patterned fabrics and especially loosely-woven lace are liable to randomly variable stretching and slippage which makes it impossible to cut under the direction of an externally imposed pattern program without regard to the instantaneous location of the pattern pre-existing on the fabric. The invention comprises lace-cutting apparatus and a lace-cutting method including optical scanning of the lace, recognition of the pattern boundary, and mutual alignment of the fabric with the fabric cutter to trace the intended cut line. Different techniques for mutual movement of the fabric and cutter are employed according to whether the pattern boundary is re-entrant or not. Preferred forms of fabric cutter include a hot-wire cutter and a laser beam cutter. The invention enables automatic high-speed cutting and trimming of lace and similar patterned fabrics.

2 Claims, 9 Drawing Sheets

METHOD OF CUTTING PATTERNS OUT OF PATTERNED FABRICS WITH A CUTTING APPARATUS WHICH INCLUDES A SCANNING DEVICE

This invention relates to apparatus and methods of cutting patterned fabrics, particularly but not exclusively patterned fabrics of the type known as lace.

The authoritative reference book "Textile Terms and Descriptions" by the Textile Institute of Manchester, U.K. defines "lace" on page 134 of its eighth edition (1986) as follows:

"lace:

A fine openwork fabric with a ground of mesh or net on which patterns may be worked at the same time as the ground is formed or applied later, and which is made of yarn by looping, twisting, or knitting, either by hand with a needle or bobbin, or by machinery; also a similar fabric made by crocheting, tatting, darning, embroidering, weaving, or knitting."

Whether formed by weaving, knitting or otherwise, lace and similar fabrics are commonly formed as a parallel-sided strip of a length usually very much greater than its width. The lace pattern may be formed as one or more pattern strips running along the length of the fabric, one or both sides of the pattern strip being scalloped or otherwise non-straight along the edge of the pattern strip. Particularly where the lace pattern strip is in the form of a relatively narrow trim, a plurality of such lace pattern strips may be formed side-by-side across the width of the as-woven (or as-knitted, etc) strip of fabric. Alternatively, the lace pattern may be formed on the fabric As a piece or discrete area having a closed boundary (as distinct from a strip of indefinite length). Again, a plurality of such discrete pattern pieces may be formed across the width of the as-woven (or as-knitted, etc) strip of fabric, and a plurality of such discrete pattern pieces will commonly be formed along the length of the fabric strip, however many pattern pieces may be formed across the width of the strip.

Pattern strips and pattern pieces may also be formed on the base fabric by techniques including but not restricted to selective dyeing, printing, embroidering, pile trimming or other localised modifications of the base fabric and while not necessarily being "lace" as defined above, such other patterned fabrics have in common with lace (for the purposes of the present invention) the feature of pattern strips or pattern areas on the base fabric, each pattern strip or pattern area having a discrete boundary.

The common problem with lace and other such patterned fabrics is the requirement that each such pattern strip or pattern area (however formed) is required to be cut from the base fabric strip in a manner which closely follows the pattern boundary, ideally without cutting into the pattern strip or pattern area and without leaving attached portions of the base fabric outside of the pattern strip or pattern area.

Therefore the problem requires an effective and efficient means of cutting the base fabric strip along the boundary or boundaries of the pattern strips or pattern areas. It is an object of the present invention to provide apparatus and methods of cutting lace and similar patterned fabrics which enable the cutting out of pattern strips and pattern areas along the boundary or boundaries of its pattern strips or pattern areas.

Hand cutting of lace strips and pieces is known, but requires the continuous and vigilant attention of a skilled person with considerable manual dexterity, and is necessarily limited in the speed of cutting and the rate of output of cut material.

Manually controlled cutting of embroidered fabric pieces with the assistance of a power-driven cutting tool is described in US4546546, but in this case, the path of the cut is under the sole control of the operator and therefore has all the limitations of manual pattern following.

A machine for automatically cutting embroidered strips having thickened scalloped edges is described in US3505917. However, this machine is limited to the cutting of strips and depends absolutely on the patterned strips having thickened edges for control of the cutting path. Maloperation of this machine can be expected if the edges of the pattern are not substantially thickened, and/or if other portions, which are not adjacent edges intended to be cut, are so thickened. Moveover, this machine is not adapted to the cutting of pattern pieces having boundaries which are closed and/or re-entrant.

GB1382541 describes a system for automatic laser cutting of garment pieces from a strip of fabric, according to preselected, stored patterns. While automating the cutting of predetermined patterns, the system of GB1382541 imposes externally determined patterns on the base fabric without regard to any pattern or surface features pre-existing on the base fabric (see for example, FIG. 11*a* of GB1382541). This is in complete contrast to the fundamental requirement of cutting out lace patterns, where the path of the cut line is determined solely by features pre-existing on the base fabric. Thus, the system of GB1382541 is incapable of being applied to the cutting out of lace patterns, since the system of GB1382541 is incapable of determining where to cut by reference to a pattern preexisting on the base fabric.

US4972745 describes another automated system for cutting predetermined pattern pieces from a strip of base fabric. In the system of US4972745, the strip of base fabric is advanced from a "machine Zero Point" on the base fabric (FIG. 3). However, even if set up with data concerning the boundaries of lace patterns, and assuming a strip of uncut lace fabric to be initially aligned with the "Machine Zero Point", the system of US4972745 might start cutting the lace correctly, but would shortly deviate from the correct cutting path because of the randomly variable stretching inherent in lace fabrics (which are loosely woven in comparison to garment textiles) and/or because of randomly variable slippage in the fabric-advancing mechanism (eg. driven fabric rollers). Thus with the system of US4972745, maintenance of a correct cut path in lace or similarly patterned fabric, and return to the correct cut path after deviation therefrom, is impossible owing to the lack of any facility in the system of US4972745 for tracing an actual intended cut path pre-existing in the fabric to be cut (as distinct from a stored notional cut path, which cannot take, account of deviations in fabric position from a nominal position).

In summary, while it might seem obvious to apply the automated pattern cutting systems of the known prior art to the cutting out of lace and similar patterned fabrics, such known pattern cutting systems cannot be applied to cutting patterns pre-existing on the fabric to be cut by reason of the complete absence of any means for tracing the pre-existing pattern. Mere storage and use of the notional pattern to be cut will not achieve a useful result, for the reasons given above.

According to a first aspect of the present invention there is provided apparatus for cutting lace and similar patterned fabrics having at least one pre-existing pattern formed thereon, the or each said pre-existing pattern having a respective boundary defining an intended cut path, said apparatus comprising fabric cutting means and relative position variation means for controllably varying the relative position of the fabric cutting means with respect to the lace or similar patterned fabric in two mutually orthogonal axes extending over the surface of the lace or similar patterned fabric, wherein said relative position variation means comprises bi-axially moveable mounting means for said fabric cutting means, said apparatus further comprising a pattern scanning means for scanning at least a selected area of said lace or similar patterned fabric, pattern recognition means coupled to said pattern scanning means for recognising a pattern boundary pre-existing on said lace or similar patterned fabric within said selected area, and relative position control means coupled between said pattern recognition means and said relative position variation means for controlling the relative position of said fabric cutting means with respect to said lace or similar patterned fabric to cause said fabric cutting means substantially to follow said intended cut path and to cut said lace or similar patterned fabric substantially along said intended cut path.

Said fabric cutting means may comprise a thermal cutting means which may be constituted by a hot-wire fabric cutter or be constituted by a laser beam fabric cutter.

Said relative position variation means preferably comprises means for controllably varying the position of said fabric cutting means across the width of the strip of lace or similar patterned fabric, and for controllably varying the lengthwise positioning of said strip of lace or similar patterned fabric with respect to said fabric cutting means.

Alternatively, said relative position variation means may comprise means for controllably varying the position of said fabric cutting means both across the width and along the length of a strip or other piece of at least temporarily stationarily positioned lace or similar patterned fabric, for example by use of a bi-axially movable mounting means for said fabric cutting means. In the latter case, said mounting means may be capable of moving said fabric cutting means for a relatively short distance in the lengthwise direction of an extended strip of said lace or similar patterned fabric while said relative position variation means is capable of moving said extended strip for a relatively long distance in the lengthwise direction thereof.

Said pattern scanning means preferably comprise an optical pattern scanning means disposed to scan at least said selected area either in or without mechanical contact therewith. Said optical pattern scanning means may be mounted for conjoint movement with movement of said fabric cutting means relative to said lace or similar patterned fabric, and said selected area of the lace or similar patterned fabric includes the point operated upon by said fabric cutting means and is preferably small in relation to said at least one pattern pre-existing therein. Alternatively, said optical pattern scanning means may be mounted in a fixed position, and said selected area of the lace or similar patterned fabric includes the point operated upon by said fabric cutting means and is preferably large in relation to said at least one pattern pre-existing thereon. As a further alternative, said optical scanning means may be mounted to scan a selected area which is ahead of the point on said lace or similar patterned Fabric operated upon by said fabric cutting means in the direction of movement of said lace or similar patterned fabric with respect to said fabric cutting means, and said relative position control means includes delay means to compensate for the advance of said selected area with respect to said point in said lace or similar patterned fabric operated upon by said fabric cutting means.

Said apparatus preferably includes a fabric support and cutting surface over which said lace or similar patterned fabric is moved by fabric propulsion means to pass beneath said fabric cutting means. Said fabric support and cutting surface may be either substantially planar or curved, preferably being formed in the latter case as a cylinder which maybe rotatable. Said fabric support and cutting surface may be apertured in a region thereof aligned with said fabric cutting means to allow passage through the aperture of said fabric cutting operation thereof.

Said fabric propulsion means preferably comprises or is associated with fabric tension control means functioning to control tension in said lace or similar patterned fabric at least in the passage thereof across said fabric support and cutting surface. Said fabric tension control means may comprise separate coarse speed controls for an uncut fabric pay-out roll and a cut fabric take-up roll, and a fine tension control in the form of a dancer roll or jockey roll acting upon said lace or similar patterned fabric between said pay-out roll and said take-up roll. Said fabric tension control means may additionally or alternatively comprise a localised fabric tensioner acting upon said lace or similar patterned fabric substantially only in the vicinity of the point thereof acted upon by said cutting means.

According to a second aspect of the present invention there is provided a method of re-entrant cutting of lace and similar patterned fabrics having at least one pre-existing pattern formed thereon, the or each said pre-existing pattern having a respective boundary defining an intended cut path, said method comprising the steps of controllably varying the relative position of fabric cutting means with respect to the lace or similar patterned fabric in two mutually orthogonal axes extending over the surface of the lace or similar patterned fabric, said method comprising the further steps of scanning at least a selected area of said lace or similar patterned fabric to recognise a pattern boundary pre-existing on said lace or similar patterned fabric, and conjointly controlling the relative position of said fabric cutting means with respect to said lace or similar patterned fabric to cause said fabric cutting means substantially to follow said intended cut path together with controlling operation of said fabric cutting means to cut said lace or similar fabric: substantially along said intended cut path, said method being characterised by reversing the direction or cutting where required to follow a re-entrant cut path.

Said selected area which is scanned may have its position varied conjointly with variations in position of said fabric cutting means, and said selected area is arranged to include the points on said lace or similar patterned fabric operated upon by said fabric cutting means and is preferably made small in relation to said at least one pattern pre-existing thereon. Alternatively, said selected area may be scanned from a substantially invariant position and said selected area includes the point on said lace or similar patterned fabric operated upon by said fabric cutting means and is preferably made large in relation to said at least one pattern pre-existing thereon. As a further alternative, said selected area may be located for scanning ahead of the point on said lace or similar patterned fabric which is operated upon by said fabric cutting means, in the direction of relative movement thereof with respect of said lace or similar patterned fabric, and said conjoint control of relative position and of fabric cutting means operation delayed to account for such advance.

Said lace or similar patterned fabric is preferably propelled across a fabric support and cutting surface in a manner which controls the tension in said lace or similar patterned fabric. Said lace or similar patterned fabric may be subjected to localised stretching thereof in a region around the point thereon which is operated upon by said fabric cutting means, said region preferably being small relative to the overall extent of said lace or similar patterned fabric.

Embodiments of the invention will now be described by way of example, with reference to the accompanying drawings wherein.

Figure 11B:
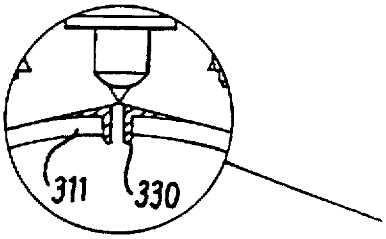
Figure 11A:
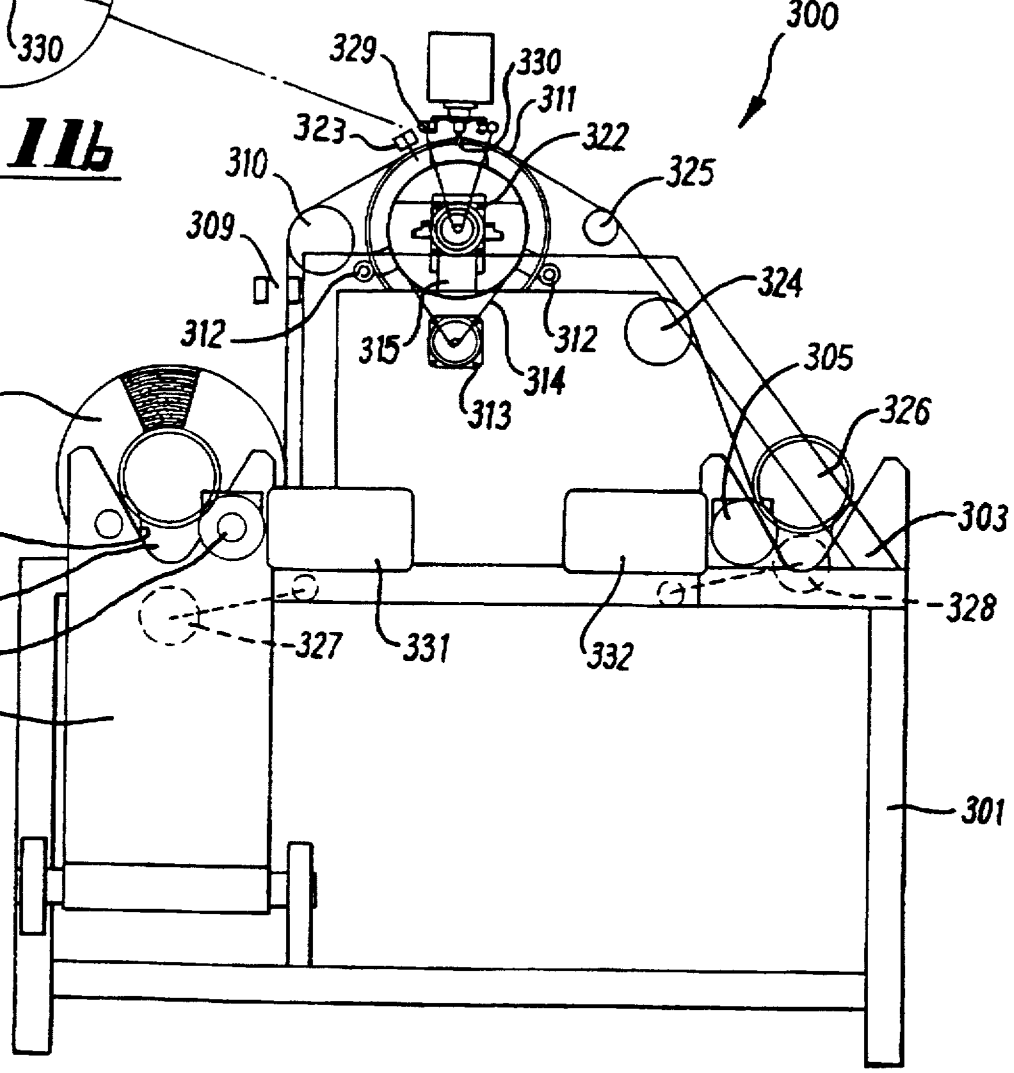
Figure 12:
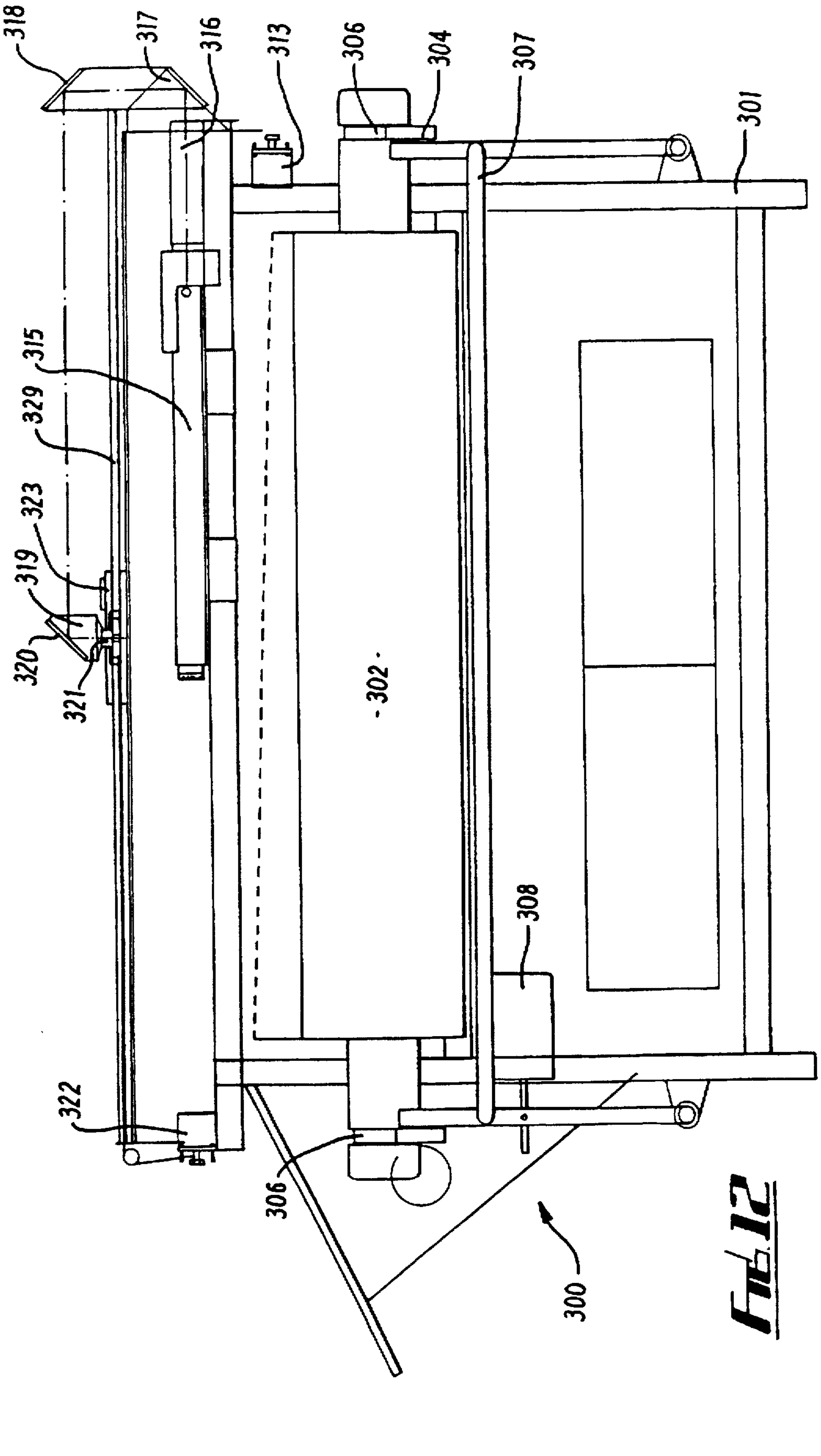

FIGS. 11*a* and 12 are respectively a side elevation and an end elevation of a third embodiment of lace cutting apparatus; and FIG. 11*b* is a fragmentary view, to a much-enlarged scale, of part of the apparatus shown in FIG. 11*a*.

Figure 1:
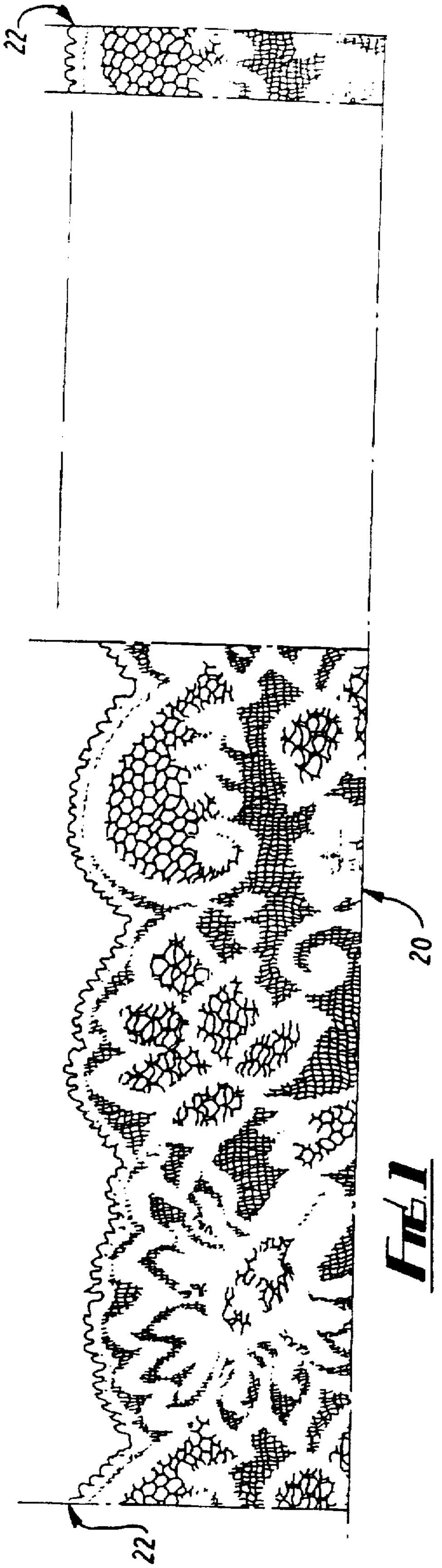
FIG. 1 is a plan view of the scalloped edge of a first lace strip.

Referring first to FIG. 1 this is a plan view of part of a first lace fabric strip 20 in the region of its scalloped edge 22 (shown as cut from an initially woven strip of uniform width, with the waste removed). The opposite edge of the strip 20 is not shown in FIG. 1, and the overall length of the strip 20 is considerably greater than the part shown in FIG. 1. The principal feature to be observed in FIG. 1 is that while the scalloped edge 22 deviates substantially and somewhat irregularly from a straight line in its as-cut form, the edge 22 is not re-entrant, ie, progressing along the edge 22 from one end of the strip 20 towards the other end of the strip 20, at no point does the edge 22 regress oppositely to the direction of this progression.

Figure 2:
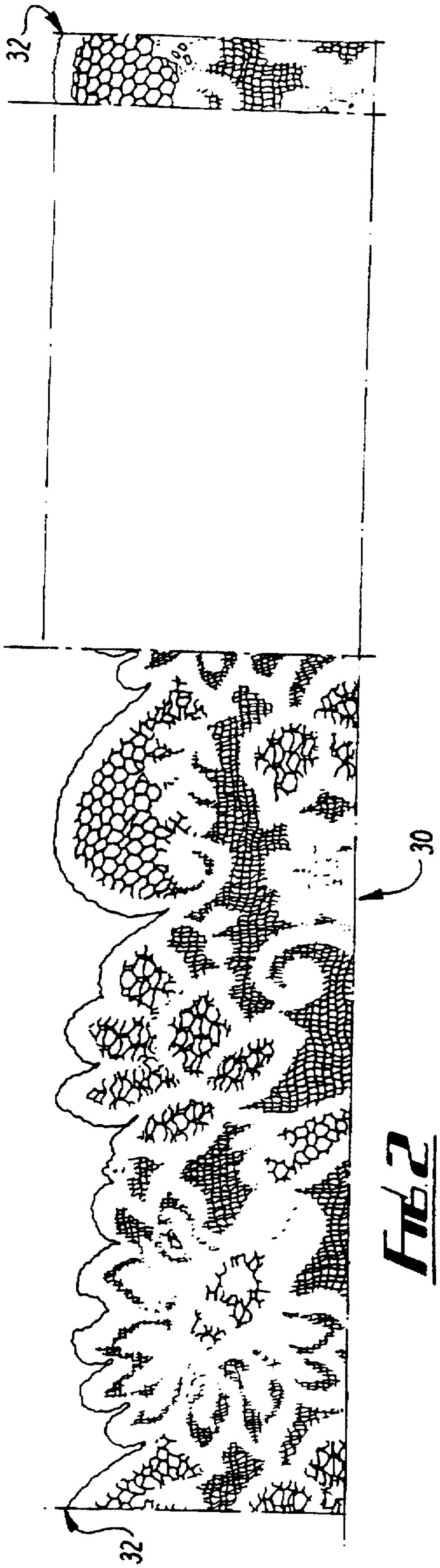
FIG. 2 is a plan view of the scalloped edge of a second lace strip which is a modified form of the first lace strip.

Referring next to FIG. 2, this is a plan view of part of a second lace fabric strip 30 in the region of its scalloped edge 32 (shown as cut from an initially woven strip of uniform width, with the waste removed). The strip 30 is basically similar to the strip 20 shown in FIG. 1, but differs in a certain fundamental respect concerning the nature of its edge 32. As in FIG. 1, the scalloped edge 32 of FIG. 2 deviates substantially and somewhat irregularly from a straight line in its as-cut form. However, in contrast to FIG. 1, the edge 32 of FIG. 2 is re-entrant, ie, progressing along the edge 32 from one end of the strip 30 towards the other end of the strip 30, at certain points the edge 32 regresses oppositely to the direction of this progression.

The practical significance of this fundamental difference (ie, non-re-entrant cut edges versus re-entrant cut edges) is that when utilising a fabric cutter acting on the lace at a single point (in a manner analogous to a monobladed fratsaw), the edge 22 (FIG. 1) can be cut by a combination of bidirectional cutter movement transverse to the edge with unidirectional longitudinal movement of the strip 20, whereas the edge 32 (FIG. 2) can not be cut by such a combination of bidirectional transverse cutter movement and unidirectional longitudinal fabric movement. This arises from the need to reverse the longitudinal movement of the lace fabric strip 30 and/or to provide for an additional component of cutter movement in the longitudinal direction.

The first embodiment of lace cutting apparatus in accordance with the present invention (described below with reference to FIGS. 3–8) is essentially concerned with non-re-entrant edge cutting, of the basic type described above with reference to FIG. 1.

The second and third embodiments of lace cutting apparatus in accordance with the present invention (described below with reference to FIG. 9–10 and FIGS. 11*a*, 11*b* and 12 respectively) are enabled to provide re-entrant edge cutting of the basic type described above with reference to FIG. 2.

Figure 9:
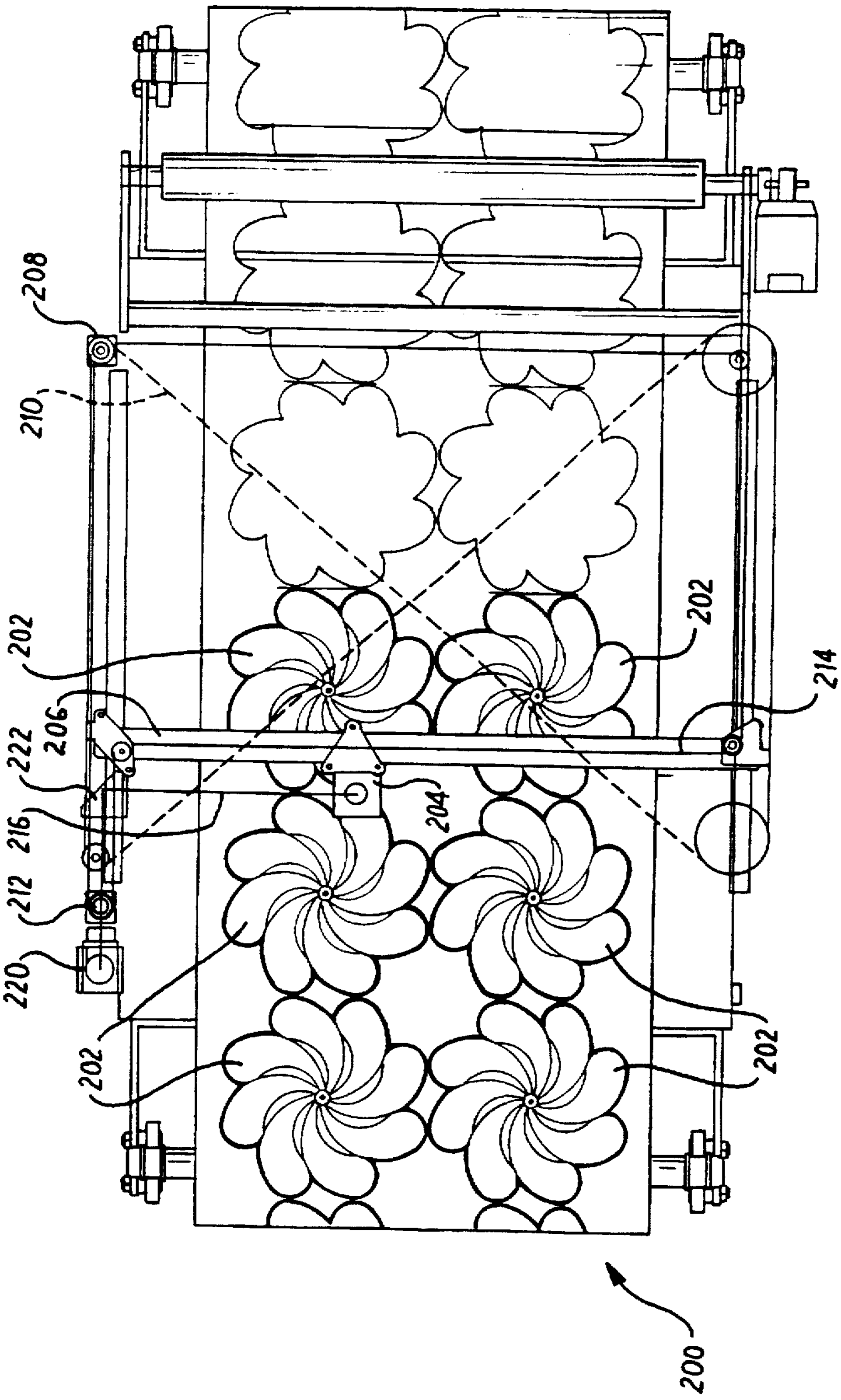
FIGS. 9 and 10 are respectively a plan view and a side elevation of a second embodiment of lace cutting apparatus.

An extreme case of re-entrant edge cutting arises when the requirement is to cut out lace pieces having a closed boundary (eg, as shown in FIG. 9), and the technical features of the second embodiment enabling it to perform lace piece cutting will also be described below.

Before proceeding to a detailed description of the various embodiments, it should be noted that while references will usually be made only to the cutting of lace, such references should be understood as equally applying to the cutting of similar patterned fabrics, of the kinds previously described, together with the cutting of other appropriate materials having one or more patterns or other detectable markings pre-existing on them and defining one or more intended cut paths.

Having described certain fundamentals of the geometry of lace cutting with reference to FIGS. 1 and 2, reference will now be made to FIGS. 3–8 for a description of the first embodiment 100 of lace cutting apparatus.

The apparatus 100 comprises a matt black plane-surface fabric support and cutting platform 102 mounted on a tubular support framework 104. At the upstream end of the apparatus 100, (the left end as viewed in FIGS. 3 and 4) laterally spaced brackets 106 extending horizontally outwards from the support framework 104 rotatably carry a supply roll 108 on respective pairs of spaced roll-shaft-mounting rollers 110.

Correspondingly, at the downstream end of the apparatus 100 (the right end as viewed in FIG. 3 and 4) laterally spaced brackets 112 extending horizontally outwards from the support framework 104 rotatably carry a take-up roll 114 on respective pairs of roll-shaft-mounting rollers 116.

Figure 3:
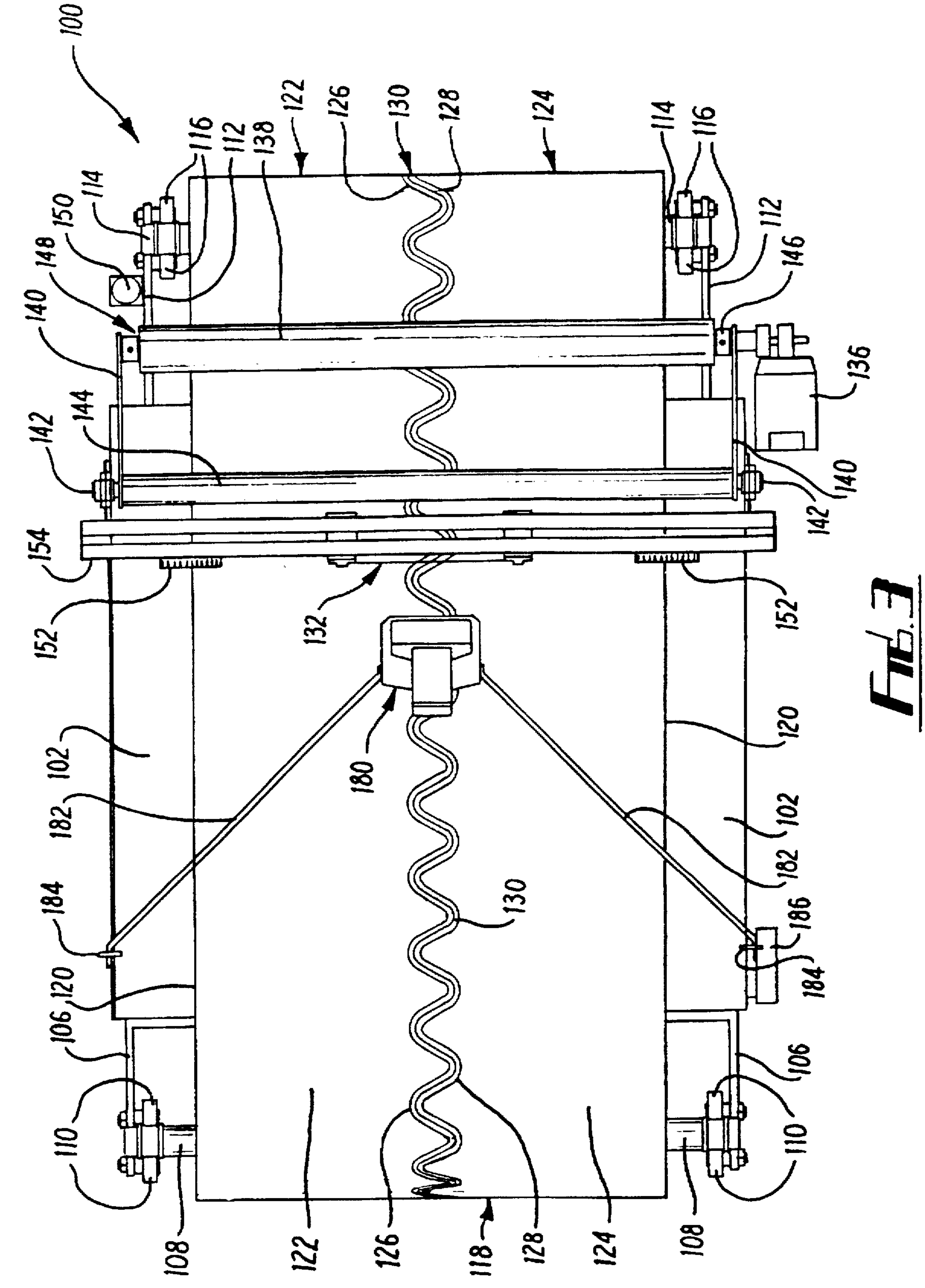
FIG. 3, 4 and 5 are respectively a plan view, a side elevation, and an end elevation of a first embodiment of lace cutting apparatus.
Figure 4:
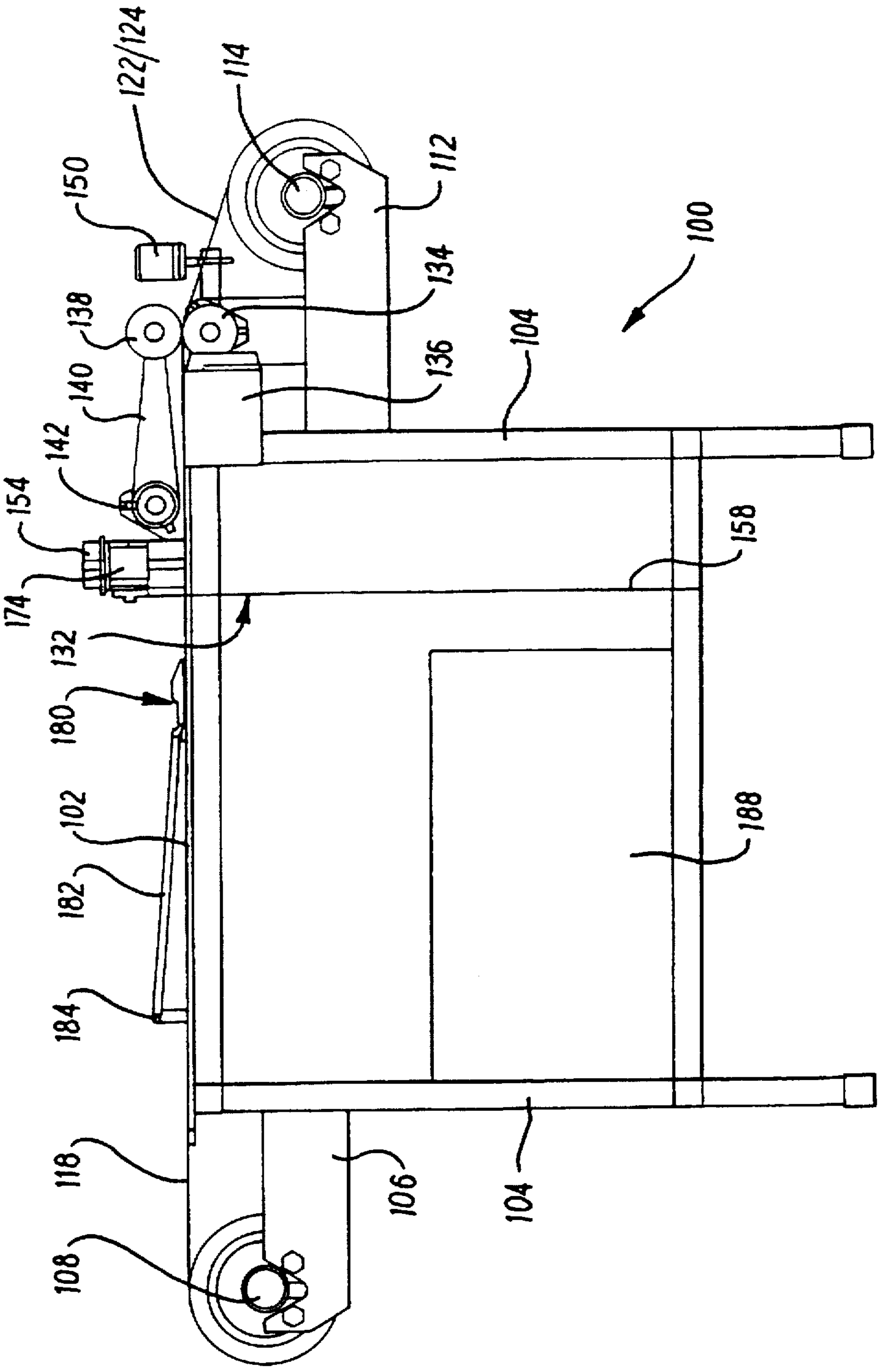

As shown in FIGS. 3 and 4, the supply roll 108 is wound with a lengthy strip 118 of as-woven lace which extends across the platform 102 to be re-wound on to the take-up roll 114. As woven, the lace strip 118 has mutually parallel outer edges 120. The strip 118 is woven as two side-by-side individual lace strips 122 and 124 each having a respective scalloped edge 126 and 128 which are mutually interdigitated and initially integral along a common boundary line 130 between their edges 126 and 128.

The function of the apparatus 100 is to sever the individual lace strips 122 and 124 one from the other, automatically and at high speed relative to the cutting rates achievable by conventional manual cutting techniques.

To this end, a hot-wire cutter 132 is mounted on and forms part of the apparatus 100, the cutter 132 being arranged to intersect the lace strip 118 on its passage from the supply roll 108 to the take-up roll 114. Propulsion of the lace strip 118 is undertaken by a drive roller 134 disposed immediately beneath the strip 118 and controllably driven by a variable speed D.C motor 136. To hold the lace strip 118 against the drive roller 134, a heavy free-running pinch roller 138 is mounted immediately above the drive roller 134. The pinch roller 138 is freely rotatably mounted on the outboard ends of a pair of pivot arms 140 which rotate about a pair of pivot supports 142, one on each side of the apparatus 100. The two pivot arms 140 are mutually rotationally coupled by a torsionally stiff torque tube 144 such that the pivot arms 140 move through mutually equal angles to prevent the pinch roller 138 from rocking as it rises and falls, ie, although the rotational axis of the pinch roller 138 has a variable height, this axis is kept horizontal at all times due to the prevention of differential height changes between one end and the other of the pinch roller 138.

At its end adjacent to the driver motor 136, the drive roller 134 is mounted in a spherical bearing block 146. A similar bearing block 148 mounting the other (non-motor) end of the drive roller 134 can have its elevation controllably altered by operation of a motorised jacking unit 150. Thus, unlike the pinch roller 138, the rotation axis of the drive roller 134 can be controllably rocked by a small amount about the longitudinal axis of the apparatus 100 (aligned left/right as viewed in FIGS. 3 and 4). Such controlled rocking of the drive roller 134 enables controlled variation of the transverse location of the pinch point of the roller pair 134/138 on the fabric strip 128 passing therebetween, and hence a controllable variable lateral skewing of the fabric strip 118 enabling steering thereof as it is propelled through the apparatus 100.

A pair of sensors 152 (FIG. 3) mounted on a transverse gantry 154 over the platform 102 continuously monitor the lateral positions of the fabric strip edges 120, and cause appropriate operation of the jacking unit 150 to keep the strip 118 substantially centralised as it is propelled through the apparatus 100.

Figure 5:
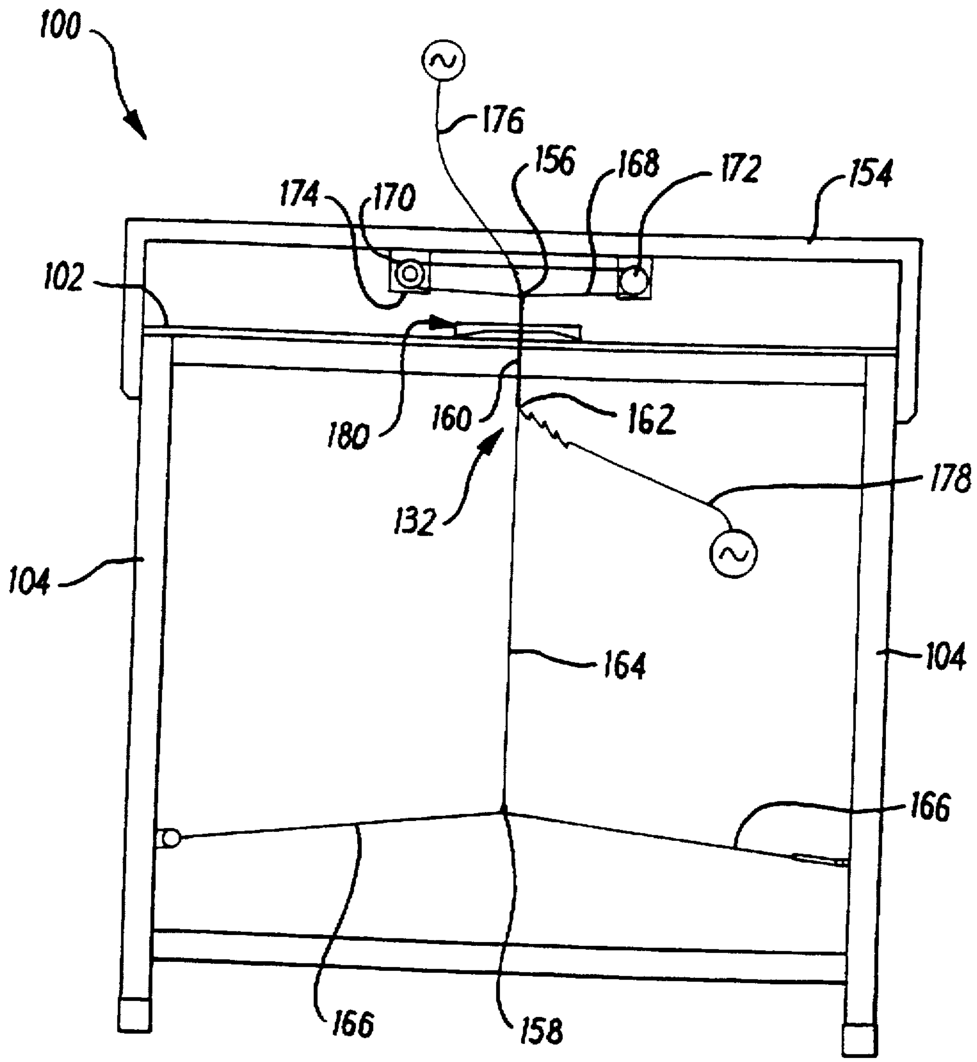

As is most clearly shown in FIG. 5, the hot-wire cutter 132 is suspended at the upper end 156 from the gantry 154, and is anchored at its lower end 158 to the lower reaches of the support framework 104. The cutter 132 comprises a relatively short unclad resistance wire 160 which passes through a transverse slot (not shown) formed in the platform 102. The lower end 162 of the resistant wire 160 is tethered by an electrically insulating cord 164 to the lower end 158 of the cutter 132 where it is laterally anchored by transverse guy cords 166 to the support framework 104.

The upper end 156 of the cutter 132 (coincident with the upper end of the resistance wire 160) is secured to a transversely aligned drive cable 168 which is formed as a continuous loop tautly suspended between a drive pulley 170 and an idler pulley 172. The drive pulley 170 is controllably rotated by a stepper motor 174 or other suitable servo motor. The pullies 170 and 172, together with the motor 174 are suitably mounted on the gantry 154.

Notwithstanding that the lower end 158 of the cutter 132 is substantially immobile, the ability of the upper end 156 to be controllably traversed by appropriate operation of the motor 174 enables the transverse portion of the resistance wire 160 in relation to the remainder of the apparatus 100 to be controlled.

Flexible flying leads 176 and 178 electrically connected respectively to the upper and lower ends 156 and 162 of the resistance wire 160 enable the wire 160 to be electrically heated by the passage therethrough of an electric current of appropriate magnitude and thereby undertake thermal cutting of a selected point on the lace strip 118. (Details concerning materials incorporated with lace strip 118 and of selection of current levels to facilitate thermal cutting of lace will be discussed subsequently).

Figure 6:
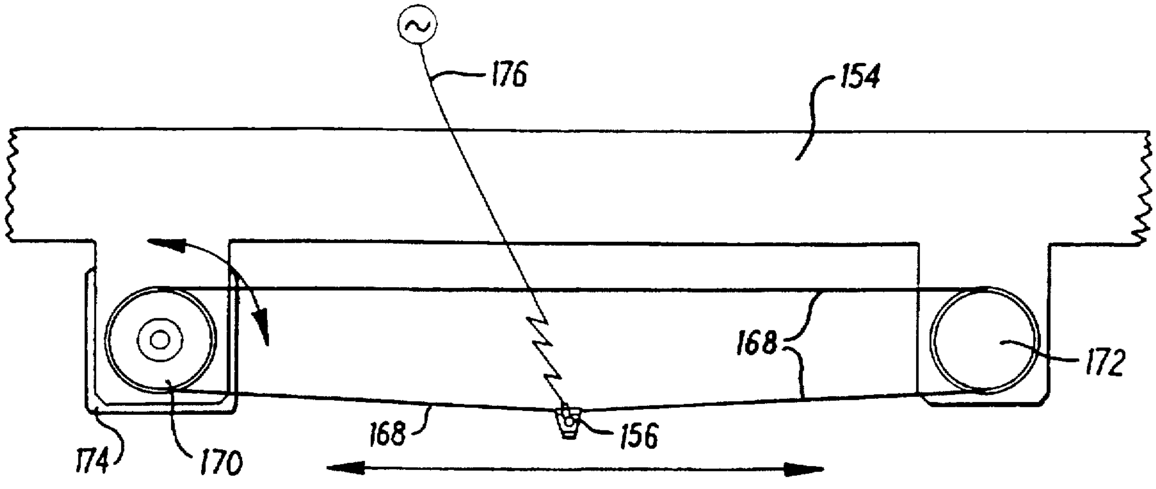
FIG. 6 is a plan view to an enlarged scale of part of the apparatus of FIG. 3–5.
Figure 7:
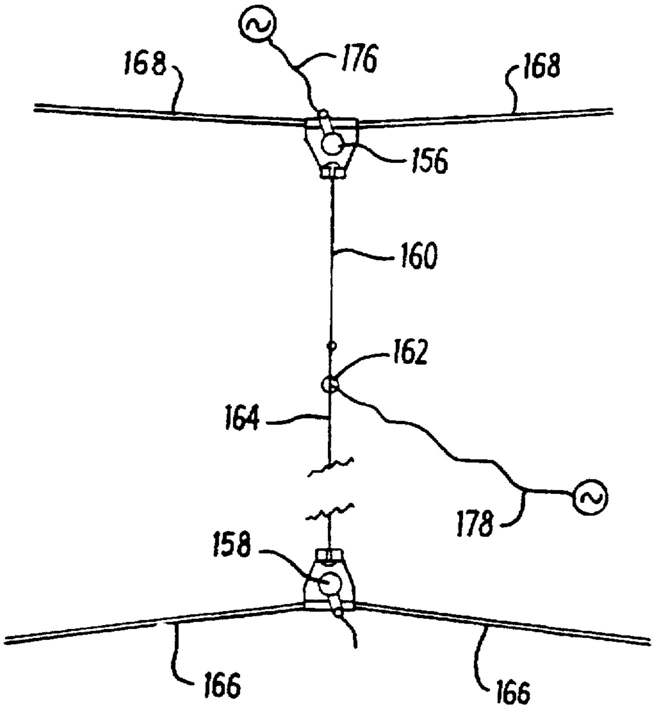
FIGS. 7 and 8 are respectively a fragmentary end elevation and a fragmentary side elevation (both to a much enlarged scale) of parts of the apparatus of FIGS. 3–5.
Figure 8:
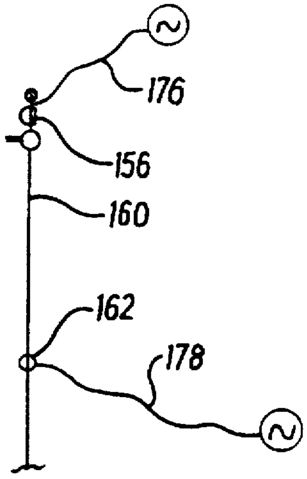

Selected details of the hot-wire cutter 132 are shown to enlarged scales in FIGS. 6, 7 and 8 which are respectively a front elevation of the upper end of the cutter 132 (including the drive cable loop 168 and its mounting pullies 170, 172), a fragmentary front elevation of the upper and lower ends 156 and 158 of the cutter 132 (together with parts of adjacent cords, cables, and tethers), and a fragmentary side elevation of the resistance wire 160 (and of its adjacent connections).

In order to provide appropriate information for the correct automatic control of the transverse position of the resistance wire 160, an optical scanner 180 is located on top of the lace strip 118 to overlie the scalloped edges 126 and 128. The horizontal location of the scanner 180 in both transverse and longitudinal directions is substantially fixed by a pair of trailing arms 182 attached at their downstream ends to the scanner 180. The upstream ends of the trailing arms 182 are mounted in respective horizontal pivots 184 to allow vertical movement of the scanner 180. A torsion control system 186 enables the weight-induced pressure of the scanner 180 on the lace strip 118 to be statically and dynamically optimised to allow the scanner 180 to "float" on the lace strip 118 without significantly dragging on the strip 118. Since the threads of which lace is formed are customarily white or another relatively light colour, and moreover the lace is of relatively open structure (at least in the boundary areas between adjacent individual strips of lace), then the optical scanner 180 can readily detect the lace of the strip 118 against the matt black surface of the fabric support and cutting platform 102. In particular, the scalloped edges 126 and 128 can readily be optically detected by the scanner 180. Readout from the scanner 180 is processed in an associated signal processing and control circuit 188 (FIG. 4) forming part of the apparatus 100. (Note that the connections between the scanner 180 and the control circuit 188, and other such power, signal, and control connections are omitted from the drawings for the sake of clarity).

The signal processing and control circuit 188 is programmed or otherwise set up to detect the instantaneous position of the common boundary line 130 of the individual lace strips 122 and 124 between their respective scalloped edges 126 and 128, with respect to the scanner 180 and hence to the apparatus 100 as a whole. The circuit 188 is also set up to take account of the upstream separation of the scanner 180 from the cutter 132, and further to take account of the speed of the lace strip 118 across the platform 102. The position information representing the detected position of the common boundary line 130 is delayed by a period proportional to the separation/speed ratio, and fed to the motor 174 to drive the hot wire 160 to an appropriate transverse position which will cut the as-woven lace strip 118 into mutually separate individual lace strips 122 and 124 by severing the strip 118 along the pattern line 130. The mutually separated individual lace strips 122 and 124 are conjointly wound on to the take-up roll 114.

An appropriate magnitude of electric current to be fed through the resistance wire 160 (via the flexible flying leads 176 and 178) to optimise the temperature of the wire 160 can be determined experimentally and controllably varied to suit instantaneous parameters of fabric speed, fabric weight, and actual fabric cutting speed (never less than the linear speed of its lace strip 118 through the apparatus 100 and greater by a factor dependent on the complexity of the pattern boundary line, particularly its true length). To the extent that an increase in fabric cutting speed over fabric strip speed is demanded due to output from the scanner 180, the short time lag before the actual resultant: cut is made can compensate for the thermal lag of the resistance wire 160 as it is more strongly heated by an electric current increased to take account of demanded extra cutting effort. (Note that it is desirable to maintain the wire 160 at an appropriate temperature since if the wire 160 is too hot, the lace will be discoloured, and if the wire 160 not hot enough, it will produce a hard melted/resolidified cut edge with a tendency to fibre pulling with resultant puckering).

The linear speed of the lace strip 118 through the apparatus 100 is controlled by the roller drive motor 136, and set up according to the type of fabric to be cut and the complexity of the pattern line to be followed. Where the individual lace strips have deeply scalloped edges, a lower fabric advance speed will be preferable to allow for the increased transverse deviations of the fabric cutter.

Figure 10:
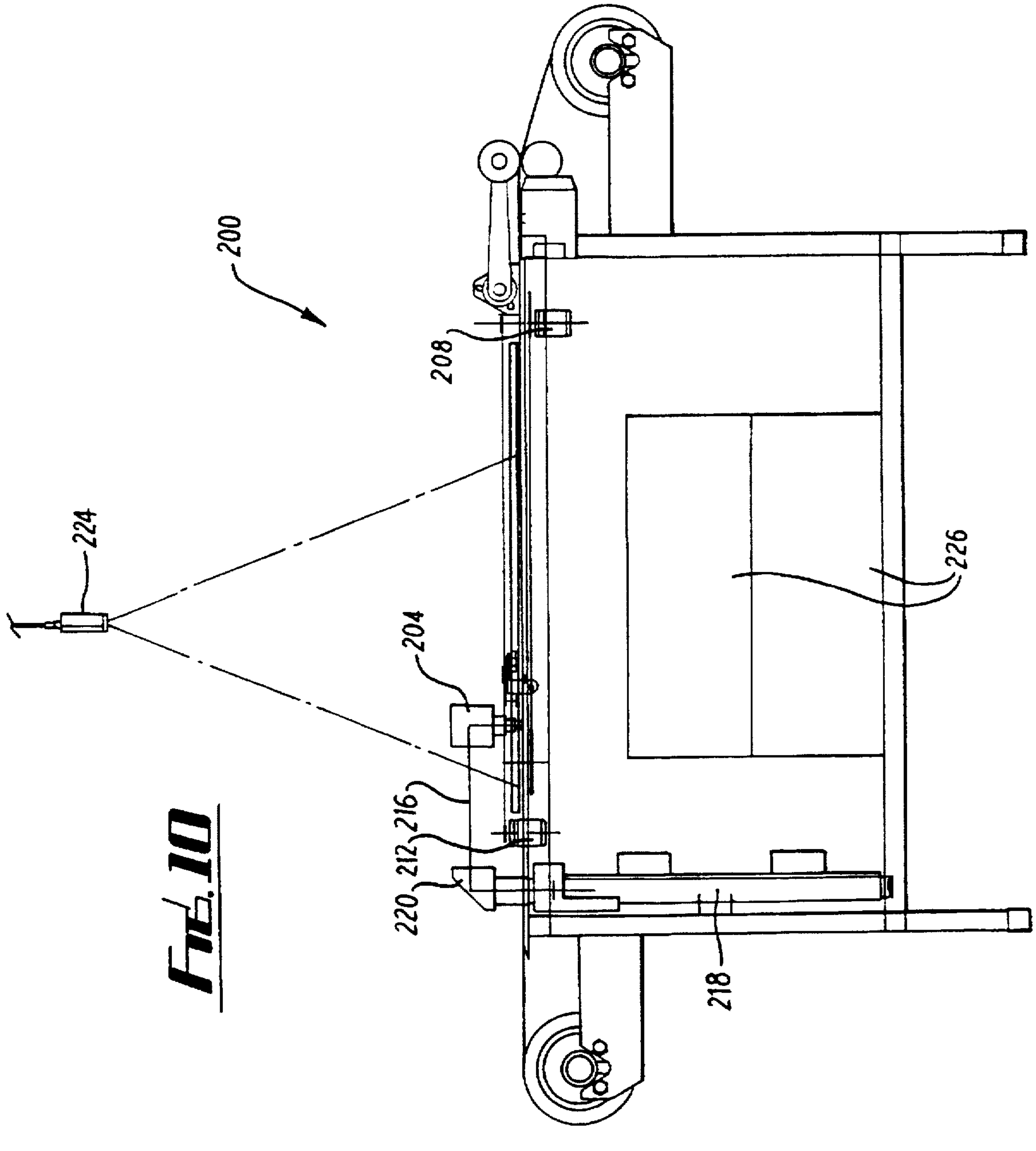

Referring now to FIGS. 9 and 10, these respectively illustrate a plan view and a side elevation of the second embodiment 200 of lace cutting apparatus in accordance with the invention. By contrast to the first embodiment 100 (wherein a hot-wire cutter capable only of one-dimensional transverse movement was employed to cut a non-re-entrant line between two side-by-side individual lace strips), the second embodiment 200 utilises a laser beam fabric cutter to cut out lace pieces 202 (FIG. 9) each having a closed boundary. However, in the second embodiment 200 the general structure of the fabric support platform, the pay-out and take-up rolls, and the fabric/propulsion rollers are the same as in the first embodiment 100 and their description will therefore not be repeated.

A basic difference in operation of the second embodiment 200 compared to operation of the first embodiment 100 arises from the necessity of the fabric cutter to trace a closed boundary path, and hence the fabric strip is not continuously transported through the apparatus; instead the fabric is moved in steps, being held stationary during cutting operations and moved only between cutting operations. The fabric cutter is mounted for controlled movement over the fabric in a two-dimensional combination of transverse and longitudinal movements, of an extent sufficient to cover the full width of the un-cut strip and to cover at least one pattern extent in the longitudinal direction.

Accordingly, the apparatus 200 has a cutting head 204 mounted for such combined bi-axial movement on a bi-directionally movable gantry 206 generally similar to the plotting mechanism of an x-y graphical plotter.

Longitudinal movement of the cutting head 204 is controlled by a stepper motor 208 which drives the gantry 206 by means of a drive cable 210. Transverse movement of the cutting head 204 is controlled by a stepper Motor 212 which drives the cutting head by means of a drive cable 214. This drive arrangement requires that for every unit of longitudinal displacement, one unit must be subtracted from the transverse displacement (as is normal in x-y plotters).

The cutting head 204 is a combined mirror and focussing lens system which receives, deflects and focuses a laser beam 216 onto the appropriate point of the fabric being cut. The laser beam 216 originates in a low-power continuous-output carbon dioxide laser 218 (FIG. 10) vertically mounted on the apparatus 200. The upwardly-directed output beam 216 from the laser 218 is deflected into a horizontal longitudinal direction by a fixed mirror 220 (FIGS. 9 and 10), deflected into a horizontal transverse direction by a further mirror 222 carried on the gantry 206, and finally through the mirror/lens cutting head 204 onto the fabric.

An overhead television camera 224 (FIG. 10) is mounted above the cutting region to include in its downwardly directed field of view at least the area which can be moved over by the cutting head 204 in its range of movements. The camera 224 (which is preferably a CCD camera) supplies optical scanning signals to a signal processing and control unit 226 forming part of the apparatus 200.

The unit 226 is preprogrammed to recognise the outline of the lace pattern pieces 202 and to correct the position of the cutting head 204 in accordance with camera-detected displacements and stretch-induced distortions of the pattern pieces 202 so as to closely trace their boundaries during cutting operations. The unit 226 also controls the level of the output power of the laser 218.

Not shown in FIGS. 9 and 10 are items such as a fume extraction system and safety interlocks to ensure that the laser beam 216 has a clear working path.

Before proceeding to a detailed description of the third embodiment of lace cutting machine in accordance with the present invention (FIGS. 11*a*, 11*b* and 12), some discussion of its underlying design considerations and operating principles will be given below.

The machine of the third embodiment has been configured to be of compact dimensions, and to be capable of profiling a range of lace patterns and types. The cutting medium illustrated is a low power C02 laser but could incorporate, for example, a hot-wire fabric cutter.

For the majority of lace patterns the fabric is assumed to pass under the cutting head such that the head can follow the required cutting path by simple lateral motions i.e. non-re-entrant as FIG. 1.

It is known however that there are patterns in which the cutting path turns backwards relative to the direction i.e. re-entrant as shown in FIG. 2. This would require the direction of fabric movement to be temporarily reversed, or the laser cutting head to be driven briefly in the direction of material travel.

It is believed that reversing such a lightly woven material as lace would cause it to stretch and hence a modified version of the non-reversing fabric propulsion of the first embodiment has been devised for the third embodiment.

In the third embodiment an optical or other suitable sensor array is used to recognise the position of the path on the fabric to be cut or trimmed, relative to previously supplied information on the lace pattern being processed.

Clearly, detection and cutting cannot be coincident and hence the cutting station must be a distance downstream. The cutting path control signal is electronically delayed to allow for this offset and thus it is important that the distance be accurately controlled.

It is believed that two factors will be important here: firstly that the fabric tension be controlled, and secondly that the offset distance be minimised, such that any variations in fabric tension will have minimal stretching effect to minimise effective variations in the offset distance.

In the third embodiment the fabric being cut is led over a highly polished cylindrical support surface in which a lateral slot has been cut to provide an exit for the laser cutting beam. The pattern detection array is an optical device of the reflective or broken beam emitter/detector type. The broken beam arrangement will use a window or aperture while the polished support surface will provide the required reflection.

Tension control is primarily by speed control drives to both the input and output bales, by providing micro-textured fabric guides, and by fine tuning the fabric tension through a conventional dancer roller-based control system adjusting the take-up bale speed.

For re-entrant patterns, the laser cutting head is rocked about the centre of the cylindrical support surface, moving as one with the cylinder, the sensor head, the cutting slot and the cutting head carriage and rails. The combination of the lightly textured guides relative to the polished support surface will minimise the stretching effect during the rocking action.

Referring now to FIGS. 11*a*, 11*b* and 12 the illustrated machine 300 is sized to handle fabric bales having a width of approximately 1 metre. The same general principles would apply to a machine dedicated to narrower material.

The machine frame 301 is a self-contained structure providing all the support and attachment points for the machine components.

The input bale 302 is mounted in a rolling vee-block arrangement 303 in which three of the rollers 304 are free-running and one of the rollers 304 is motor-driven by a motor 305. The input bale spindle is furnished with grooves 306 which locate on the rollers 304 to provide lateral location of the spindle.

The rolling vee-blocks 303 are mounted on a parallelogram arrangement 307 which is positioned laterally by a motor and jack screw arrangement 308.

This mechanism 307 forms part of a fabric centring system taking its control signals from fabric edge sensors 309.

The fabric unrolling from the input bale 302 passes up over a glide 310, which may be manufactured from fine grade brushed and hard-anodised aluminium alloy. The guide 310 may be rotated at a very low speed to spread the position of the wearing surface.

The fabric then passes onto a cylindrical support surface 311 which is a highly finished and spectrally polished component. The cylinder 311 is mounted on free-rolling supports 312 at both ends, with its angular position being driven and controlled by a stepper motor 313 and a wire cable system 314.

For some particularly finely woven fabrics a local tensioner 330 is fitted in the cutting slot in the cylinder 311. This has the effect of locally stretching and magnifying the area being cut.

The laser 315 in this third embodiment is mounted co-axially with the cylinder 311 and may be attached to the machine frame, along with its diverging optics 316 and associated electronics and accessories.

The output beam from the laser 315 is folded through a pair of face reflecting mirrors 317 and 318 which are mechanically attached to the cylinder 311.

The laser beam then travels to a traversing lens carriage 319 which comprises a mirror 320 and focussing optics 321 to converge the beam down onto the cutting point on the fabric.

The traversing lens carriage 319 is guided on rails 329 which are mechanically attached at their ends to the cylinder 311 and positioned such that the cutting point is at all times over the cutting slot in the cylinder 311.

The carriage 319 is driven laterally by a stepper motor 322 and cable system under instructions from the pattern recognition electronics. A sensor array 323 is mounted immediately upstream of the cutting point, and positioned laterally to cover the width of the pattern being processed. The sensor array 323 may be attached to the machine frame, or moved with the oscillations of the cylinder 311.

As the cut fabric comes off the cylindrical support surface 311, it travels over a guide 324 which is exactly as described for the guide 310.

A tension jockey or dancer roll 325 is positioned between the cylinder 311 and the guide 324. This accurately measures the material tension and provides information to input and output bale drive motors 331 and 332 to maintain precise tension control.

The cut fabric is collected on a takeup bale 326 which is mounted on a motor-driven and rolling vee-block system similar to the input bale arrangement.

The speed of fabric movement is monitored by tachometer rollers 327 and 328 which bear directly on the input and output bales 302 and 326. In this way they measure the fabric speed irrespective of the bale diameters.

Operation of the lace cutting machine 300 is as follows:

When a particular pattern of lace is loaded onto the machine 300, information in the form e.g. of a floppy disc is read into the machine control processor.

The sensor array 323 is adjusted to centre on the pattern to be cut. As fabric is run under the sensor array 323, the system recognises the border to be cut or trimmed, and with information on the fabric speed, produces the required offset and movement instructions to the cutting laser head assembly 320/321.

For non-re-entrant patterns the support surface 311 remains static, but for re-entrant patterns (and creative work), the system recognises that the cutting path has curved back and hence activates the rocking action as required.

Compared to the first and second embodiments 100 and 200, the machine 300 has been altered to be of more compact dimensions but to retain the simplicity and economy of construction of the basic design.

The control of fabric tension is improved by the system of driving both the input and the output bales plus the addition of micro-textured guide rollers which give friction control to the lace as it passes over them.

The fabric guidance is further improved by a centering system which takes a signal from edge sensors and moves the input bale axially on its vee-block mount as it is feeding lace onto the cutting area.

The large flat cutting table has been replaced by a cylindrical support surface which adds to the tension control now in the area local to the cutting beam.

Fabric control is further enhanced by means of a dancer roller which can adjust the bale speeds by signalling variations in the tension of the lace after the cutting operation.

Pattern recognition has been improved by use of a sensor array positioned immediately upstream of the cutting area and just above the lace surface which it recognises as it moves over the cylinder.

The cutting of patterns which turn backwards relative to the direction of movement of the fabric (ie. which are re-entrant) is now achieved by rocking the whole cutting head assembly as instructed by the pattern sensors, thus presenting the cutter with the re-entrant route. This has the benefit of fixing the relative positions of the cutting head, the sensor, and the cutting slit (the cutting position). The effect of stretching of the lace is minimised by the nature of the polished surface of the cylinder.

The X-Y movement is replaced longitudinally by the aforementioned system and the lateral or Y movement by a carriage on rails which positions the cutting beam over the slot in response to signals from the sensor array.

The handling of finely woven and narrow strip fabrics is enhanced by a tensioning insert 330 (FIG. 11*b*) which is fitted into the cutting slot to provide additional localised tensioning of the lace by slight stretching.

Compared to the prior art manual cutting systems, the lace cutting apparatus and methods of the present invention have the prime advantage of increased cutting speed; 20 metres/minute versus 4–5 metres/minute for previous systems.

There are also the merits of simplicity and economy of construction.

The advantage of the route recognition system allows for a greater and ever-increasing range of work. Patterns can be stored in memory for use in the future. The occurrences of fabric stretch and mis-positioning can be corrected electronically in the more complex laser cutter with the laser optics being directed around the actual required cutting path.

While certain variations and modifications have been described above, the invention is not restricted thereto, and other modifications and variations can be adopted without departing from the scope of the invention as defined in the appended claims.

We claim:

1. A method of re-entrant cutting of patterned fabrics having at least one pre-existing pattern formed thereon, each said pre-existing pattern having a respective pattern boundary defining an intended cut path, wherein said intended cut path at least closely approximates said pattern boundary, said method comprising the steps of:

providing a cutting apparatus, said cutting apparatus including a support surface, a fabric cutting means operatively mounted for movement above said support surface, and a scanning means mounted above said support surface, positioning said patterned fabric on said support surface, said patterned fabric having a longitudinal axis and a transverse axis, scanning at least a selected area of said patterned fabric with said scanning means to identify a location of said pattern boundary pre-existing on said patterned fabric, and cutting said patterned fabric with said fabric cutting means by:

positioning said fabric cutting means with respect to said pattern boundary so that said fabric cutting means intersects said patterned fabric substantially on said intended cut path, and moving said fabric cutting means with respect to said patterned fabric to cause said fabric cutting means to cut said patterned fabric while following said intended cut path along said pattern boundary, wherein said moving step includes moving said fabric cutting means in a combination of directions which includes both directions of the transverse axis and both directions of the longitudinal axis of the patterned fabric, and maintaining said fabric cutting means substantially on said intended cut path by continuously tracking with said scanning means the location of said pattern boundary, and continuously correcting the position of the fabric cutting means as required to maintain the position of said fabric cutting means substantially on said intended cut path.

2. A method of re-entrant cutting as set forth in claim 1, wherein a portion of said patterned fabric is positioned in a working area on said support surface, and said scanning and cutting steps are performed in said working area, the method further comprising, moving said patterned fabric after cutting of said portion of patterned fabric in said working area to bring another portion of the patterned fabric into said working area.

* * * * *